United States Patent [19]

Matsumura et al.

[11] Patent Number: 5,425,122

[45] Date of Patent: Jun. 13, 1995

[54] SYNTHETIC RESIN OPTICAL TRANSMISSION MEDIUM AND ITS PREPARATION METHOD

[75] Inventors: Yasuo Matsumura; Shogo Miyata, both of Yokohama; Kanji Kusada, Yokosuka; Kaede Terauchi, Kawasaki, all of Japan

[73] Assignee: Nippon Petrochemicals Company, Limited, Tokyo, Japan

[21] Appl. No.: 996,952

[22] Filed: Dec. 24, 1992

[30] Foreign Application Priority Data

Dec. 26, 1991 [JP] Japan .................... 3-357675

[51] Int. Cl.$^6$ ............................ G02B 6/18
[52] U.S. Cl. ........................ 385/124; 385/143; 264/1.24
[58] Field of Search ........... 385/124, 143; 264/1.5, 264/171, 174, 167, 290.5

[56] References Cited

U.S. PATENT DOCUMENTS

| | | | |
|---|---|---|---|
| 3,838,905 | 10/1974 | Irie | 385/124 |
| 3,999,834 | 12/1976 | Ohtomo et al. | 385/124 |
| 4,587,065 | 5/1986 | Kouichi et al. | 264/1.5 |
| 4,593,975 | 6/1986 | Nakauchi et al. | 385/124 |
| 4,822,122 | 4/1989 | Yamamoto et al. | 385/124 |
| 4,852,982 | 8/1989 | Yamamoto et al. | 385/116 |
| 5,095,079 | 3/1992 | Yean et al. | 526/60 |
| 5,253,323 | 10/1993 | Koike et al. | 385/143 |
| 5,254,904 | 10/1993 | Van De Leest et al. | 313/479 |

FOREIGN PATENT DOCUMENTS

| | | |
|---|---|---|
| 0208159 | 1/1987 | European Pat. Off. . |
| 0242636 | 10/1987 | European Pat. Off. . |
| 496893 | 8/1992 | European Pat. Off. . |
| 497984 | 8/1992 | European Pat. Off. . |
| 54-30301 | 9/1979 | Japan . |
| 57-185001 | 11/1982 | Japan . |
| 1439627 | 6/1976 | United Kingdom . |

OTHER PUBLICATIONS

Patent Abstracts of Japan, JP 62 098 303, May 7, 1987.

*Primary Examiner*—Frank Gonzalez
*Attorney, Agent, or Firm*—Scully, Scott, Murphy & Presser

[57] ABSTRACT

The present invention relates to provide a drawn optical transmission medium having excellent heat resistance and a continuous refractive index distribution in a good productivity at a low cost, and the disadvantages in a conventional synthetic resin optical transmission medium can be eliminated, which method is characterized by a step of crosslinking a polymer having a continuous refractive index gradient distributed from the peripheral portion to the central portion in its cross section and having a crosslinkable functional groups, after the step of heating and drawing.

11 Claims, 1 Drawing Sheet

SYNTHETIC RESIN OPTICAL TRANSMISSION MEDIUM AND ITS PREPARATION METHOD

BACKGROUND OF THE INVENTION (1) Field of the Invention

The present invention relates to an optical transmission medium made of a drawn synthetic resin, and more specifically, it relates to a synthetic resin optical transmission medium having a continuous refractive index gradient distributed from the peripheral portion to the central portion in the cross section of the optical transmission medium itself and having excellent heat resistance. The invention also relates to a preparation method of the synthetic resin optical transmission medium.

(2) Description of the Prior Art

Heretofore, as optical fibers for transmitting light, there are optical fibers made of a quartz glass and those made of plastics. In the fibers made of the quartz glass, transmission loss is very small. Accordingly, they are widely used for long-distance optical transmission and data transmission. On the other hand, in the optical fibers made of plastics, the transmission loss is larger than that of the optical fibers made of the quartz glass. However, the optical fibers made of the plastics have advantages in that they are light in weight, excellent in flexibility and large in diameter, and can be connected easily with various elements because they are worked easily. In addition, they are inexpensive, so that they are used for short-distance transmission such as data linkage and various sensors.

The optical fibers made of plastics are classified into a GI type (graded index type) having a continuously varied refractive index distribution and an SI type (stepped index type) composed of two different layers called a core and a clad having respectively different refractive indexes. The former one is expected in the use for short-distance large capacity communication with the advantage of its wide transmission band, and the latter one is used for optical transmission and sensors.

Most plastics optical fibers presently used are of the SI type in which the main component is poly(methyl methacrylate) having high transparency, and the glass transition point of this poly(methyl methacrylate) is as low as about 100° C. So that, these plastics optical fibers cannot be continuously used at high temperatures. In recent years, it has been attempted to use the plastics optical fibers under such high-temperature conditions as in microwave ovens or engine rooms of cars. Therefore, in order to improve the heat resistance of the plastics optical fibers, various investigations have been made. For example, in order to improve the heat resistance of poly(methyl methacrylate), there are disclosed a method in which methyl methacrylate and N-arylmaleimide are copolymerized, a method in which methyl methacrylate and styrene or vinyltoluene and maleic anhydride are copolymerized, a method in which polycarbonate is used as a core, a method in which a protective layer is formed outside a clad, and a method in which larger molecules are used in the alcohol moiety of methacrylate (U.S. Pat. No. 4,576,438).

However, these attempts could not improve the heat resistance of the plastics optical fibers to such a level as to withstand the above-mentioned high-temperature conditions.

In addition, most of these attempts are directed to the improvement of the SI type plastics optical fibers having two layers of the core and the clad, and in the GI type having the continuous refractive index distribution, investigation have scarcely been made.

In manufacturing the SI type plastics optical fiber, a melt spinning method in which two kinds of fused polymers are extruded through a nozzle, and this method comprises a polymerization step to prepare polymers having uniform compositions and a subsequent step to spin two or more kinds of polymers by melt extrusion to form two refractive index steps.

On the contrary, in the GI type plastics optical fiber in which a monomer composition continuously changes in the radial direction of the cross section of fibers, it is difficult theoretically to employ the above-mentioned method. So that, such a method is commonly used that, after the formation of a preform having a refractive index distribution, spinning is carried out without changing the condition of distribution. In the case that the copolymerization with a monomer having a high glass transition point is carried out so as to impart the heat resistance to the fiber, it is necessary to employ a quite different polymerization method, or it is impossible to form the refractive index distribution therein. For these reasons, the preparation of the GI type plastics optical fiber has been difficult.

Accordingly, it has been hitherto required to produce a synthetic resin optical transmission medium of refractive index distribution type which can be used at high temperatures and which has a continuous refractive index distribution.

BRIEF SUMMARY OF THE INVENTION

In view of the above-mentioned state of the art, an object of the present invention is to provide a drawn synthetic resin optical transmission medium having excellent heat resistance and a continuous refractive index distribution in a good productivity at a low cost. Thereby, eliminating the disadvantages in the synthetic resin optical transmission media obtained by conventional heat resistance improving method with copolymerization or by a conventional method using a heat-resistant monomer.

A first aspect of the present invention is to provide a drawn synthetic resin optical transmission medium which comprises a polymer having a continuous refractive index gradient distributed from the peripheral portion to the central portion of the cross section of a polymer and having a crosslinked polymer structure.

A second aspect of the present invention is to provide a method for preparing a drawn synthetic resin optical transmission medium which comprises a polymer having a continuous refractive index gradient distributed from the peripheral portion to the central portion of the cross section of a polymer and having a crosslinked polymer structure. The method is characterized in that the polymer having the continuous refractive index gradient distributed from the peripheral portion to the central portion of the cross section of the polymer is crosslinked after it is heated and drawn.

A third aspect of the present invention is to provide a method for preparing a synthetic resin optical transmission medium which comprises a step to crosslink the polymer with crosslinkable functional groups after heating and drawing.

A fourth aspect of the present invention is to provide a polymer having a continuous refractive index gradient distributing from the peripheral portion to the central portion in its cross section and having a crosslinkable functional groups.

DETAILED DESCRIPTION OF THE INVENTION

Figure 1:
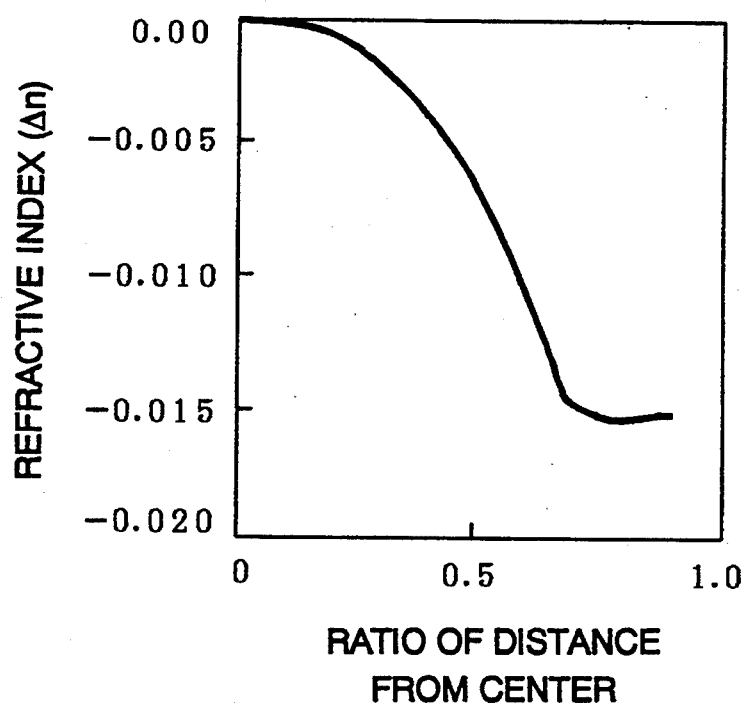
FIG. 1 is a graph showing a refractive index distribution in the radial direction of an optical fiber obtained in an example.

The present invention will be described in more detail.

A refractive index distribution type synthetic resin optical transmission medium according to the present invention is prepared through a method comprising a step of forming a polymer having crosslinkable functional groups and a continuous refractive index distribution, a step of heating and drawing the obtained polymer, and a step of forming a crosslinkage to the drawn polymer.

It is the most important matter in the present invention that the crosslinkable functional groups do not react substantially in the initial preparation step of the polymer having the refractive index distribution. In addition, it is necessary that the crosslinkable functional groups do not react in the heating and drawing step.

The combination of the steps to form the refractive index distribution with the step to crosslink is exemplified by:
- thermal radical polymerization—cationic crosslinked by light;
- thermal radical polymerization—crosslinking by photodimerization;
- thermal radical photopolymerization—crosslinking by electron rays;
- condensation polymerization—crosslinking by radical addition; and
- condensation polymerization—crosslinking by photodimerization.

Among them, the combination of thermal radical polymerization—cationic crosslinking by light is particularly preferable from an industrial viewpoint. Meanwhile, much attention should be paid so that the crosslinkable functional groups may not react in the heating and drawing step.

The polymer used in the present invention having the continuous refractive index gradient distributed from the peripheral portion to the central portion of the polymer and having the crosslinkable functional groups can be prepared in any known method, so long as the method has not influence on the subsequent step. However, the polymer must be a thermoplastic linear polymer because it is then subjected to the heating and drawing step. In view of this point, a polymer obtained by, for example, the radical polymerization of a vinyl monomer is suitable.

The method to prepare the polymer having the continuous refractive index gradient distribution from the peripheral portion to the central portion of the cross section of polymer with the utilization of the radical polymerization of a vinyl monomer, is exemplified by:
- a method in which a mixture of two kinds of monomers having different refractive indexes is slowly fed to a rotating cylinder and it is copolymerized in which the copolymer is allowed to gradually grow toward the inside of the cylinder with changing the ratio of the monomers little by little (Japanese Laid-Open Patent Publication No. 57-185001);
- a method in which the difference between reactivity ratios of two kinds of vinyl monomers is utilized (Japanese Laid-Open Patent Publication No. 54-30301);
- a method in which the dissolution of a polymer is utilized (European Laid-Open Patent Nos. 496893 and 497984); and
- a method in which the selective diffusion effect of two kinds of vinyl monomers is utilized (ibid.)

Such a radical polymerization can be achieved by mixing a vinyl monomer, one or more kinds of vinyl monomers to be copolymerized, a known radical polymerization initiator such as benzoyl peroxide and, if necessary, a known molecular weight modifier such as alkylmercaptan in a proper quantity, and then copolymerizing the mixture. In the present invention, however, it is inevitable that at least one vinyl monomer having crosslinkable functional groups is used in the copolymerization.

Typical examples of the vinyl monomer having the crosslinkable functional groups to be copolymerized include glycidyl acrylate, glycidyl methacrylate, $\beta$-methylglycidyl acrylate, $\beta$-methylglycidyl methacrylate, 2,3-epithiopropyl acrylate, 2,3-epithiopropyl methacrylate, dicyclopentenyl acrylate, dicyclopentenyl methacrylate, allyl glycidyl ether, 2-(p-vinylphenyl)-propylene oxide, 4-vinylepoxycyclohexane, 6-vinylepoxynorbornane, 6-ethylideneepoxynorbornane, glycidyl p-vinylbenzoate, vinyl cinnamate, vinyl $\alpha$-cyanocinnamate, vinyl cinnamylidenepyruvate, cinnamyl acrylate, cinnamyl methacrylate and vinyl monomers having isophorone groups. These have thermally radically polymerizable functional groups as well as the functional groups which can be cationically crosslinked by light rays but not crosslinked by heat.

Among them, the monomers having a glycidyl group and/or an epithio group are preferable, and in particular, glycidyl acrylate, glycidyl methacrylate, 2,3-epithiopropyl acrylate and 2,3-epithiopropyl methacrylate are preferable.

As the vinyl monomer which is copolymerized with the above-mentioned monomer having the crosslinkable functional groups, any vinyl monomer can be used, so long as it can uniformly copolymerize to produce a transparent polymer.

In the meantime, in order to form the refractive index distribution, at least two kinds of monomers are necessary. In addition, it is required that the refractive index of a polymer separately prepared from a monomer is different by at least 0.005 from those of other separately prepared polymers. Thus, monomers to be combined must be selected in view of the above point. The monomer having the crosslinkable functional groups may be one of the combination of these monomers.

It is preferable, however, that in addition to the above-mentioned vinyl monomer having crosslinkable groups, at least two kinds of vinyl monomers are selected and they are then subjected to radical copolymerization in accordance with the procedure described in the above-mentioned patent publication to form the refractive index distribution.

Typical examples of such vinyl monomers include vinyl chloride, vinyl acetate, styrene, $\alpha$-methylstyrene, p-chlorostyrene, acrylonitrile, methacrylonitrile, vinyl phenylacetate, vinyl benzoate, vinyl fluoride, vinylnaphthalene, vinylidene fluoride, vinylidene chloride, methyl acrylate, methyl methacrylate, ethyl acrylate, ethyl methacrylate, butyl acrylate, butyl methacrylate, cyclohexyl acrylate, cyclohexyl methacrylate, phenyl acrylate, phenyl methacrylate, benzyl acrylate, benzyl methacrylate, naphthyl acrylate, naphthyl methacrylate, adamantyl acrylate, adamantyl methacrylate, bornyl acrylate, bornyl methacrylate, hydroxyalkyl acrylate, hydroxyalkyl methacrylate, perfluoroalkyl acrylate and perfluoroalkyl methacrylate.

Among them, the particularly preferable vinyl monomers are styrene, acrylates and methacrylates, for example, methyl acrylate, methyl methacrylate, ethyl acrylate, ethyl methacrylate, butyl acrylate, butyl methacrylate, cyclohexyl acrylate, cyclohexyl methacrylate, benzyl acrylate, benzyl methacrylate, adamantyl acrylate, adamantyl methacrylate, perfluoroalkyl acrylate and perfluoroalkyl methacrylate.

When the vinyl monomer having the above-mentioned crosslinkable functional groups is copolymerized, the crosslinkable functional groups are contained in the resultant polymer. Preferable examples of the crosslinkable functional groups include the glycidyl group and the epithio group, as mentioned above. Furthermore, it is preferred that the vinyl monomer having the crosslinkable functional groups are copolymerized so that the content of the crosslinkable functional groups in the polymer may be 3 wt. % or more. When the content of the crosslinkable functional groups is less than 3 wt. %, crosslinking which will be described hereinafter is insufficient, and the purpose to improve the heat resistance cannot be achieved. No particular restriction is put on the upper limit of the content of the crosslinkable functional groups. For example, in the case that the vinyl monomer itself to form the refractive index distribution is the monomer having the crosslinkable functional groups, the vinyl monomer can be blended and copolymerized in an amount enough to form the refractive index distribution. However, the amount of the vinyl monomer is usually 50 wt. % or less.

Since the thus obtained copolymer is subjected to heating and drawing operation in the next step, it is important that the copolymer is a linear polymer which is substantially free from crosslinkage. Usually, the crosslinked polymer cannot be drawn. However, it may be crosslinked to a degree that the heating and drawing treatment is acceptable.

For the above-mentioned reasons, it is necessary to carry out the copolymerization without using a monomer which easily gives rise to the crosslinking, for example, a polyfunctional monomer having 3 or more radically polymerizable functional groups, or even when such a monomer is used, the reaction conditions as to cause the crosslinking to occur are not employed.

In the present invention, the polymer which is prepared by the above-mentioned method and which has a continuous refractive index gradient distributed from the peripheral portion to the central portion of the polymer and the crosslinkable functional groups, is subjected to the heating and drawing step. This heating and drawing can be carried out in the like manner as the heating and drawing operation of linear copolymers. For example, the drawing can be achieved by heating the polymer at a temperature of 100° to 400° C., and then drawing it at a drawing rate of 0.1 cm/sec to 10 m/sec in a drawing ratio of 1.1 to 100.

No particular restriction is put on the diameter of the thus drawn transmission medium. However, for example, when a fiber of a too large diameter is subjected to the subsequent crosslinking reaction by the use of ultraviolet rays, the crosslinking does not proceed sufficiently sometimes, because the intensity of the ultraviolet rays is lowered during it passes through the mass of a synthetic resin and the intensity of the light is insufficient in the inner part of the material. Therefore, the diameter of the fiber is preferably 20 mm or less, more preferably 3 mm or less, and most preferably 1 mm or less.

In the present invention, after the step of heating and drawing, the polymer having the continuous refractive index gradient distribution from the peripheral portion to the central portion of the polymer and having the crosslinkable functional groups, is crosslinked. This crosslinking reaction can be carried out in any known manner such as a crosslinking technique with the aid of ultraviolet rays, infrared rays, visible rays, or actinic rays such as Y rays or electron rays.

For example, in the case that the polymer having the continuous refractive index gradient distributed from the peripheral portion to the central portion of the polymer and having the crosslinkable functional groups, was obtained by thermal radical polymerization as described above, the cationic crosslinking by ultraviolet rays or the crosslinking by electron rays is preferable. Particularly, it is economically most preferable to employ the cationic crosslinking using ultraviolet rays.

Furthermore, in the crosslinking operation, a compound (hereinafter referred to as "a crosslinking auxiliary agent") which contains in its molecule one or more groups having the same reactivity as that in the crosslinkable functional groups of the polymer of the present invention can be used together. In the case that the crosslinking reaction utilizes the ring opening of epoxy groups, typical examples of the crosslinking auxiliary agent include epoxy group-containing compounds having a molecular weight of 1000 or lower such as styrene oxide, hexahydrophthalic acid glycidyl ester, diepoxides of 6-vinyl-2-norbornene and 6-ethylidene-2-norbornene, and bisphenol A-epichlorohydrin adducts.

In the crosslinking reaction, a crosslinking initiator may be used. As the crosslinking initiator, any one can be used, so long as it is inactive to the radical copolymerization reaction for manufacturing the polymer having the continuous refractive index gradient distributed from the peripheral portion to the central portion of the polymer and having crosslinkable functional groups. For example, in the case that the above-mentioned polymer is prepared through thermal radical polymerization reaction, a cationic photocrosslinking initiator which is inert to heat can be used. In general, the amount of the cationic photo-crosslinking initiator is in the range of about 1 to 5 wt. % of the monomers to be polymerized.

As such a cationic photocrosslinking initiator, any known cationic photopolymerization catalyst can be used. Examples of the cationic photopolymerization catalysts include aryldiazonium salts, diaryliodonium salts, triarylsulfonium salts, triarylselenonium salts, dialkylphenacylsulfonium salts, dialkyl-4-hydroxysulfonium salts, sulfonic acid esters, iron-arene compounds and silanol-aluminum complexes.

These cationic photopolymerization catalysts can be used singly or in the form of a mixture of two or more kinds of them in an arbitrary ratio. Particularly in view of transparency which is required for the optical transmission medium, the dialkylphenacylsulfonium salts which are free from coloring in the crosslinking are preferable.

In addition, additives such as a molecular weight modifier and an antioxidant can be used, if necessary.

In order to disperse the above-mentioned crosslinking auxiliary agent, crosslinking initiator or antioxidant in the polymer having the continuous refractive index distribution, such methods can be employed that additives are dissolved in and mixed with a monomer solution in the step to form the refractive index distribution or that additives are added from the outside by diffusion after the drawing. However, when it is desired to uniformly disperse the additives in the polymer without changing the refractive index distribution, the former method is preferable. For example, when the radical polymerization is used in the formation of the refractive index distribution, the above-mentioned crosslinking auxiliary agent, crosslinking initiator or antioxidant can be added to a mixture of a plurality of vinyl monomers, and if necessary, the radical polymerization initiator and the molecular weight modifier.

In the case that the cationic photo-crosslinking is done by the use of ultraviolet rays, a conventionally known source of ultraviolet ray can be used, For example, a source having desired irradiation energy such as a high-pressure or a low-pressure mercury lamp or a xenon lamp can be used. The time length required for the crosslinking depends upon the intensity of a light source, the distance from the light source, the diameter of the polymer in the form of fibers. It is generally in the range of 1 second to 30 minutes.

The degree of crosslinking can be determined by the solubility of the polymer in an organic solvent such as chloroform. In general, when the crosslinking is carried out, the solubility of the polymer in an organic solvent such as chloroform may be 10 wt. % or less. When the crosslinking is carried out to such a degree that the polymer is not substantially dissolved therein, the heat resistance of the polymer can be sufficiently high.

As is apparent from the foregoing passage, the heat-resistant optical transmission medium can be obtained by carrying out the crosslinking reaction without deforming the refractive index distribution of the polymer which has the continuous refractive index gradient distributed from the peripheral portion to the central portion.

Now, the present invention will be described in more detail with reference to examples. Incidentally, monomers were purified by means of filtration through a microfilter, distillation or recrystallization prior to use, and polymerization was done in a closed system or in a clean atmosphere.

EXAMPLE 1

Copolymerization was carried out in an air bath at 70° with slowly pouring the following materials into a rotary glass vessel which was rotating on a horizontal axis 1000 rpm.

| | |
|---|---|
| A mixture of 2,2,2-trifluoroethyl methacrylate and methyl methacrylate (the mixing ratio of both of them was changed from 90/0 to 0/90 parts) | |
| Glycidyl methacrylate (the sum of the above mixture and this compound was 100 parts) | 10 parts |
| Phenacyltetramethylenesulfonium hexafluorophosphate | 1 part |
| Azobisisobutyronitrile | 0.1 part |
| n-Octylmercaptan | 0.2 part |

The parts hereinafter referred to is on the basis of weight unless otherwise indicated.

After the polymerization, a polymer in the form of a pipe of 30 mm in outer diameter and 6 mm in inner diameter was obtained by taking off the glass vessel.

Polymerization was then caried out by pouring the following materials into the obtained pipe.

| | |
|---|---|
| Methyl methacrylate | 90 parts |
| Glycidyl methacrylate | 10 parts |
| Phenacyltetramethylenesulfonium hexafluorophosphate | 1 part |
| Azobisisobutyronitrile | 0.1 part |
| n-Octylmercaptan | 0.2 part |

Thus a solid rod was obtained. The rod was cut to remove both the ends therefrom and then thermally drawn with indirectly heating in a cylindrical heating tube at 250° C. to obtain a fiber of 0.6 mm in diameter.

The plastics-made optical fiber was wound up and it was irradiated with ultraviolet rays from a high-pressure mercury lamp at 25° C. for 30 minutes at an intensity of 2J/cm$^2$.

The thus obtained plastic optical fiber was transparent and had a refractive index distribution shown in the attached FIG. 1. Values of transmission loss at 25° C. and 120° C. were not largely different and they were about 520 dB/km at 650 nm. The fiber was constituted, to its central portion, of a polymer which was insoluble in chloroform.

EXAMPLE 2

To a horizontally held glass tube were fed 90 parts of methyl methacrylate and 10 parts of glycidyl methacrylate. Both the ends of the tube were sealed up. After that, ordinary thermal polymerization was carried out with rotating the tube at 1000 rpm to obtain a polymer tube of 10 mm in outer diameter and 6 mm in inner diameter composed of a copolymer having a molecular weight of 100,000.

The outer glass tube was cracked and removed. In the thus obtained polymer tube were put 1 part of phenacyltetramethylenesulfonium hexafluorophosphate as a photocrosslinking agent, 0.15 part of n-butylmercaptan as a chain transfer agent, 10 parts of glycidyl methacrylate containing 0.50 part of benzoyl peroxide as a polymerization initiator, and a mixture of 70 parts of methyl methacrylate and 20 parts of benzyl methacrylate, and thermal polymerization was done at 70° C. for 20 hours in the atmosphere. During the polymerization, the polymer tube was rotated at 1000 rpm.

After the polymerization, it was subjected to a thermal treatment under a reduced pressure of 0.2 mm Hg at 100° C. for 20 hours. The content of the remaining monomers in the obtained polymer was less than 0.5 wt. %.

The polymer tube itself and the polymer in the tube were integrally combined. The polymer tube together with the polymer in the tube was cut to remove both the ends therefrom and then thermally drawn by the indirect heating in a cylindrical heating tube at 250° C. to obtain an optical fiber of 0.6 mm in diameter.

The thus obtained optical fiber was irradiated with ultraviolet rays from a high-pressure mercury lamp at 25° C. for 30 seconds at an intensity of 2 J/cm$^2$.

The resultant plastics optical fiber was transparent and had a refractive index distribution shown in FIG. 1. Values of transmission loss at 25° C. and 120° C. were not largely different, and the loss was 380 dB/km at 650 nm. The fiber was constituted, to its central portion, of a polymer which was insoluble in chloroform.

As understood from the foregoing description, according to the method of the present invention, it is possible to prepare without difficulty a synthetic resin optical transmission medium having a continuous refractive index gradient distributed from the peripheral portion to the central portion in the cross section of the material and having good heat resistance.

What is claimed is:

1. A drawable linear polymer rod having a continuous refractive index gradient distributed from the peripheral portion to the central portion of the rod and having crosslinkable functional groups and which is substantially free from cross linkage.

2. The polymer according to claim 1, wherein said crosslinkable functional groups are glycidyl groups or epithio groups.

3. The drawable linear polymer rod according to claim 1, wherein said polymer is a polymerized or copolymerized product containing at least one vinyl monomer having thermally radically polymerizable functional groups as well as functional groups which can be cationically cross-linked by actinic light but not cross-linked by heat.

4. The drawable linear polymer rod according to claim 3, wherein said vinyl monomer is selected from the group consisting of glycidyl acrylate, glycidyl methacrylate, β-methylglycidyl acrylate, β-methylglycidyl methacrylate, 2,3-epithiopropyl acrylate, 2,3-epithiopropyl methacrylate, dicyclopentenyl acrylate, dicyclopentenyl methacrylate, allyl glycidyl ether, 2-(p-vinylphenyl)propylene oxide, 4-vinylepoxycyclohexane, 6-vinylepoxynorbornane, 6-ethylideneepoxynorbornane, glycidyl p-vinylbenzoate, vinyl cinnamate, vinyl α-cyanocinnamate, vinyl cinnamylidenepyruvate, cinnamyl acrylate, cinnamyl methacrylate and vinyl monomers having isophorone groups.

5. A method for preparing a drawn synthetic resin optical transmission medium comprising a polymer having a continuous refractive index gradient distributed from the peripheral portion to the central portion in the cross section of the polymer and having a crosslinked polymer structure, said method comprising the steps of:

(a) drawing with heat a drawable linear polymer rod having a continuous refractive index gradient distributed from the peripheral portion to the central portion of the rod and having crosslinkable functional groups and which is substantially free from crosslinkage, to produce a fiber; and (b) crosslinking said fiber.

6. The method for preparing a synthetic resin optical transmission medium according to claim 5, wherein said polymer is crosslinked with said crosslinkable functional groups after heating and drawing.

7. The preparation method according to claim 6, wherein said crosslinkable functional groups are glycidyl groups or epithio groups.

8. The preparation method according to any one of claims 5 to 7, wherein said crosslinking is carried out by the irradiation with actinic rays.

9. The preparation method according to claim 8, wherein said actinic rays are ultraviolet rays.

10. The method according to claim 5, wherein said polymer is a polymerized or copolymerized product obtained from at least one vinyl monomer having thermally radically polymerizable functional groups as well as functional groups which can be cationically crosslinked by actinic light but not crosslinked by heat.

11. The method according to claim 10, wherein said vinyl monomer is selected from the group consisting of glycidyl acrylate, glycidyl methacrylate, β-methylglycidyl acrylate, α-methylglycidyl methacrylate, 2,3-epithiopropyl acrylate, 2,3-epithiopropyl methacrylate, dicyclopentenyl acrylate, dicyclopentenyl methacrylate, allyl glycidyl ether, 2-(p-vinylphenyl)propylene oxide, 4-vinylepoxycyclo-hexane, 6-vinylepoxynorbornane, 6-ethylideneepoxynorbornane, glycidyl p-vinylbenzoate, vinyl cinnamate, vinyl α-cyano-cinnamate, vinyl cinnamylidenepyruvate, cinnamyl acrylate, cinnamyl methacrylate and vinyl monomers having isophorone groups.

* * * * *

UNITED STATES PATENT AND TRADEMARK OFFICE
CERTIFICATE OF CORRECTION

PATENT NO. : 5,425,122
DATED : July 13, 1995
INVENTOR(S) : Yasuo Matsumura, et al.

It is certified that error appears in the above-indentified patent and that said Letters Patent is hereby corrected as shown below:

Column 7, line 53: "70°" should read --70° C--

Column 10, line 33, Claim 11: "α-methylglycidyl" should read --β-methylglycidyl--

Signed and Sealed this

Fourth Day of June, 1996

Attest:

BRUCE LEHMAN

Attesting Officer     Commissioner of Patents and Trademarks